Sept. 13, 1966  C. S. COCKERELL  3,272,271
AIR CUSHION VEHICLES HAVING MOVABLE CUSHION-CONTAINING WALLS
Filed June 16, 1964  5 Sheets-Sheet 1

INVENTOR
C. S. COCKERELL
BY
Cameron, Kerkam & Sutton
ATTORNEYS

Sept. 13, 1966  C. S. COCKERELL  3,272,271
AIR CUSHION VEHICLES HAVING MOVABLE CUSHION-CONTAINING WALLS
Filed June 16, 1964  5 Sheets-Sheet 2

INVENTOR
C. S. COCKERELL
BY
Cameron, Kerkam & Sutton
ATTORNEYS

United States Patent Office 3,272,271
Patented Sept. 13, 1966

3,272,271
AIR CUSHION VEHICLES HAVING MOVABLE
CUSHION-CONTAINING WALLS
Christopher Sydney Cockerell, Bassett, Southampton,
England, assignor to Hovercraft Development Limited,
London, England, a British company
Filed June 16, 1964, Ser. No. 375,536
Claims priority, application Great Britain, June 21, 1963,
24,820/63
19 Claims. (Cl. 180—7)

This invention relates to vehicles for travelling over a surface and which, in operation, are supported above the surface, at least in part, by a cushion of pressurised gas formed and contained beneath the vehicle.

In such vehicles the cushion of pressurised gas may be contained at its periphery by a wall depending from the main body of the vehicle, gas being supplied to the cushion and escaping between the bottom of the wall and the surface. This form of vehicle is generally referred to as a "plenum chamber" vehicle.

An alternative form of vehicle is one in which the cushion of pressurised gas is contained for at least part of its periphery by a curtain of moving fluid (for example, a gas) issuing from the lower part of the vehicle. The fluid which forms the curtain may issue from the bottom surface of the main body of the vehicle or may issue from the bottom of a wall which depends from the main body of the vehicle. A vehicle may have a wall without a gas curtain beneath it extending for part of the periphery of a cushion and a wall with a fluid curtain formed beneath it extending for another part of the periphery of the cushion.

The walls may be rigid in both forms of vehicle, but to avoid damage are generally flexible, deflecting upward when contacted by the surface. Whilst deflection as a result of contact with the surface may be acceptable for slow speeds, light structures and with relatively small amounts of deflection, damage can occur to the walls. This possibility of damage is much greater at higher speeds and when large deflections are necessary and in addition, in these circumstances, undesirable loads and drags are likely to be imposed on the vehicle.

Ideally a wall should deflect so that at all times a clearance is maintained between the bottom of a wall and the surface over which the vehicle is travelling. Whilst it is possible to attach to the wall planing surfaces or hydrofoils when operating over water, and skids or wheels when operating over land to assist in deflecting the wall, these components are still liable to damage and undesirable loads may still be imposed on the vehicle.

According to the invention, there is provided a vehicle for travelling over a surface and which, in operation, is supported at least in part above the surface by a cushion of pressurised gas formed beneath the vehicle, the cushion being contained for at least part of its periphery by a wall movably attached to the vehicle body and wherein, in providing support for the vehicle, fluid streams between the wall and said surface, and which includes means sensitive to variations in the flow characteristics of the fluid stream resulting from a variation in the clearance between the lower edge of said wall and said surface and means for moving the wall vertically in response to such variation in flow characteristics.

If the vehicle is of the "plenum chamber" type, the fluid is gas streaming outwardly from the cushion through the clearance beneath the lower edge of the wall. If the vehicle is of the "fluid-curtain" type, the fluid (usually a gas) can stream outwardly from within the wall or it can stream from one of the sides of the wall.

Various characteristics of the fluid stream can be utilised to provide a means for sensing or indicating a variation in clearance. A single characteristic may be used alone or two or more in combination. The most suitable or convenient characteristic or combination of characteristics selected will depend on the form the fluid stream takes. For example, if the fluid streams form a supply port formed in or adjacent to the bottom of the wall and forms a curtain which flows across the clearance between the bottom of the wall and the surface, variation of the clearance will affect the back pressure in the supply port and also this effect can be detected in the duct leading to the supply port. Other characteristics liable to be affected by variation in clearance are the angle of ejection of at least some of the flow paths of the curtain-forming fluid stream from the supply port and the velocity of the fluid. A further characteristic which can be utilised is the variation in mass flow of the fluid, or some effect of such variation. Again, the change in velocity or pressure distribution across the stream of fluid forming the curtain can also be detected and used. Where any of the curtain-forming fluid is recovered through a recovery port spaced from the supply port, variation of the clearance can also vary the angle of the flow of fluid into the recovery port, the velocity of the flow and the mass of the flow.

The fluid may flow in a coherent stream from beneath the lower part of the wall. For example, the fluid may issue from a port either in the bottom surface of the main body of the vehicle or from a port at some position intermediate the top and bottom of the wall, the fluid then flowing down one surface of the wall and beneath the bottom of the wall, the bottom of the wall possibly being shaped to assist the flow. The flow beneath the wall may be inwards, towards the cushion, or outwards. Variation in the clearance between the bottom of the wall and the surface will affect the characteristics of the flow, such as the velocity or pressure.

In a plenum chamber form of vehicle, the characteristics of the outward flow of fluid streaming from the cushion to atmosphere through the clearance beneath the wall will vary with variation in clearance. Typical examples of characteristics which will vary are velocity, direction and pressure.

Instead of using variations in the flow characteristics of the curtain-forming fluid, or in the flow of fluid to or from the cushion, separate independent flows of fluid may be specifically provided. Thus, for example, in a plenum chamber form of vehicle, probes in the form of small bore tubes may be formed in or attached to the wall, extending from top to bottom of the wall, and ending at the wall bottom in a port through which the fluid issues. Such tubes can be very small in bore as only small mass-flows will be required. Variation of one or more characteristics of the flow of fluid in or from a tube, such as the back pressure in the tube, will occur as a result of variation in the clearance between the bottom of the wall and the surface. The tubes can be positioned at spaced apart locations along the walls.

Where separate, independent, streams of fluid are used then generally variation in one or more characteristics will be sensed by a sensing device. The sensing device can control the means for moving the wall up and down. Where variations in the characteristics of the flow of a larger mass flow of fluid is used, such as the flow of curtain-forming fluid or the flow of fluid from the cushion beneath the (plenum) wall, then either the variations can be sensed by a sensing device which in turn controls apparatus for moving the wall up or down, or the variations themselves may be used directly to cause movement of the wall. Thus, for example, variations in the back pressure, or static head pressure in a duct supplying fluid for forming a curtain can be used to cause movement of the wall, both locally and as a whole.

The invention will be readily understood by the following description of certain embodiments, by way of example, in conjunction with the accompanying drawings in which.

Figure 1:
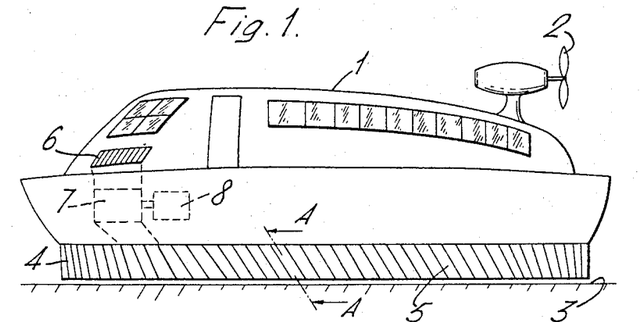
FIGURE 1 is a side elevation of a vehicle embodying one form of the invention.

FIGURE 1 illustrates a vehicle 1, of the plenum chamber type, which is propelled by a propeller 2 and is supported above the surface 3 by a cushion of pressurised gas (air) formed beneath the vehicle, the cushion being contained at the periphery of the vehicle by a flexible wall 4 comprising a series of wall members 5 pivotally attached at their upper ends to the main body of the vehicle. Air is drawn in through intakes 6 by a compressor 7 driven by an engine 8, the air being fed through the bottom of the vehicle to form the cushion.

Figure 2:
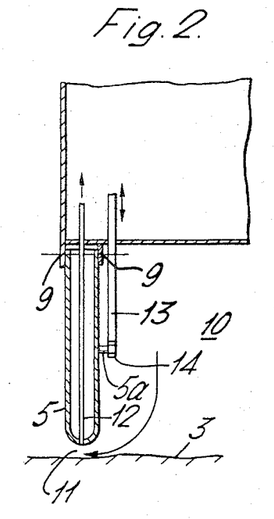
FIGURE 2 is a vertical cross-section on the line A—A of FIGURE 1.

The construction and operation of the individual wall members 5 forming the flexible wall 4 can be seen more readily in FIGURE 2. Each wall member 5 is in the form of a hollow structure pivotally attached at 9 to the main body of the vehicle 1. In the example shown, the member is of rigid construction, but alternatively, may be of flexible construction. If flexible construction, the wall member 5 may retain its shape purely by the stiffness of the material or the wall member may be inflated. If inflated, then each wall member 5 is fed with air from either the compressor 7, or some other compressor.

The cushion of pressurised air is formed in the space 10 and, once formed, excess air streams beneath the lower edge of the wall members 5 creating a clearance 11 between the wall members 5 and the surface 3. Depending upon the mass-flow of air to the space 10, the profile of the bottom of the members 5 and the weight of the vehicle, the clearance 11 assumes a particular value. Also the characteristics of the flow of air streaming through the clearance, e.g. velocity of the flow and static pressure on the bottom of the members, assume particular values. A probe in the form of a small bore tube 12 passes down through each wall member 5 and has an open end extending through the lower edge of the wall member. The upper end of the tube 12 is connected to a pressure sensing device, not shown, and senses a pressure at the bottom of the wall member 5 which is indicative of the characteristics of the stream of air at that position. Variations in the clearance 11 will vary the flow characteristics of the air stream and a pressure change is fed via the tube 12 to the pressure sensing device.

A wall member actuator in the form of a rod 13 is attached at its lower end 14 to a spigot 5a attached to each member. At its upper end each rod 13 is attached to rod actuating apparatus (not shown) which acts on the rod 13 to raise and lower each wall member 5 in response to pressure variations fed to the pressure sensing device by way of the associated tube 12. The wall members 5 are normally attached to the vehicle 1 in such a manner (see FIGURE 1) that they are inclined downwards and rearwards, being capable of movement upward more towards the horizontal or downwards more towards the vertical.

Figure 3:
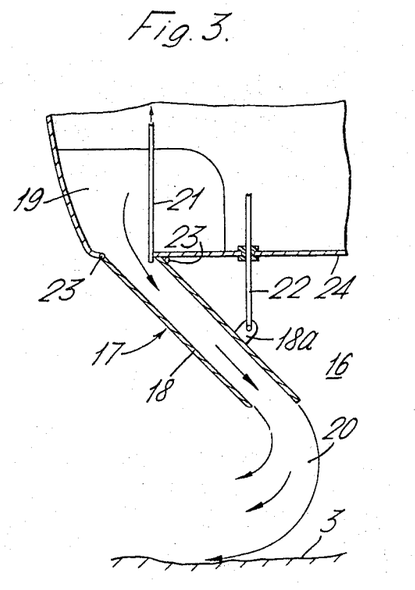
FIGURE 3 is a cross-section, similar to that of FIGURE 2, illustrating another form of the invention.

FIGURE 3 illustrates an embodiment of the invention as applied to vehicles in which the cushion 16 is bounded for the upper part of its periphery by a flexible wall 17 and for the lower part by a curtain 20 of moving gas. The wall comprises one or more hollow wall members 18 pivotally attached at 23 to the bottom 24 of the main body of the vehicle. Air is fed from a suitable source (similar to compressor 7 in FIGURE 1 for example) to a duct 19. From the duct 19 the fluid flows down through each wall member 18 and streams from the bottom to form the curtain of moving gas 20 in the normal manner. Each wall member 18 is inclined rearwards in a manner similar to the members 5 in FIGURE 1. Depending upon the mass-flow of gas forming the curtain and on the weight of the vehicle the clearance between the lower edge or bottom of the wall member 18 and the surface 3 will assume a certain value. Similarly the characteristics of the gas-flow, e.g. velocity and static head pressure within each wall member 18, will also assume certain values. A decrease in the clearance between the bottom of the wall member 18 and the surface 3 will cause the static head pressure within each wall member to increase, whilst an increase in clearance will decrease the static head pressure. The variation in static pressure is detected by a small bore tube 21 which has its lower end opening into the upper interior of each wall member 18 and is connected at its upper end to a pressure sensing device, not shown. An actuating rod 22 is pivotally attached at its lower end to a lug 18a on the wall member 18 and at its upper end to apparatus (not shown) for moving the wall member 18 up or down in accordance with variations in the static pressure within the wall member.

Figure 4:
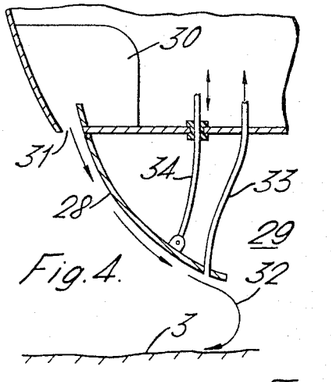
FIGURE 4 is another cross-section similar to that of FIGURE 2, illustrating a further form of the invention.
Figure 5:
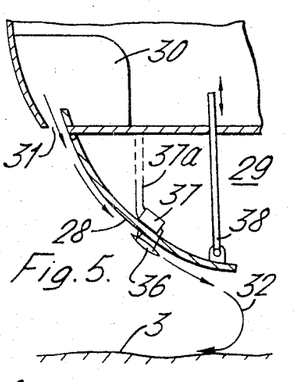
FIGURE 5 illustrates a modified form of the example illustrated in FIGURE 4.

FIGURES 4 and 5 illustrate two forms of an embodiment of the invention in which a stream of gas is caused to travel down one side of a wall, adhering to the wall due to the Coanda effect. The gas then issues from or adjacent the lower edge of the wall to form a moving curtain.

In both figures the wall comprises one or more wall members 28 which are curved in vertical cross-section, the lower part of a wall member curving inwards towards the space 29 in which is formed the cushion of pressurised gas. Gas (air) flows from a duct 30 through a port 31 and streams down the outside of the wall member 28 to the bottom of the wall member. Once the cushion has been formed, the gas streaming from the bottom of the wall member 28 curves round and outwards in the normal manner forming a curtain of moving gas 32. Once the curtain has been formed, the vehicle will assume a position which gives a clearance between the bottom of the wall member 28 and the surface 3 which will be dependent on the mass-flow of the curtain-forming gas and on the weight of the vehicle. The flow of curtain-forming gas will have certain characteristics which will vary with variation in the clearance between the bottom edge of the wall member 28 and the surface 3.

Thus, for example, as illustrated in FIGURE 4, a pressure near the bottom of the wall member 28 is sensed through a tube 33 penetrating the lower end of the wall member. A variation in wall member to surface clearance will affect the flow path of the curtain 32 resulting in a variation in the pressure sensed through the tube 33. The upper end of the tube 33 is connected to a pressure sensing device (not shown) which controls apparatus for moving an actuating rod 34 which is pivotally attached to the wall member 28 and moves the member up and down.

An alternative form of sensing means is illustrated in FIGURE 5. Instead of sensing pressure variations as in FIGURE 4, the variation in the flow path of the curtain-forming fluid is detected by a vane 36 pivotally attached to the member 28 and positioned in the path of the curtain-forming gas so as to be pivoted thereby. Variation of the flow path will vary the position of the vane 36. Movement of the vane 36 is caused to operate an electrical switch or similar signal producing means 37 which in turn is used, by way of signal lines 37a, to actuate a control device (not shown) which controls apparatus for moving the wall member 28 up or down by means of an actuating rod 38 pivotally attached to the member 28.

Figure 6:
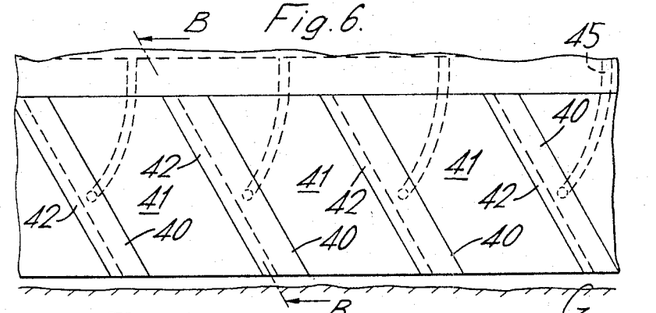
FIGURE 6 is a side view of the lower part of a vehicle incorporating a further form of the invention.
Figure 7:
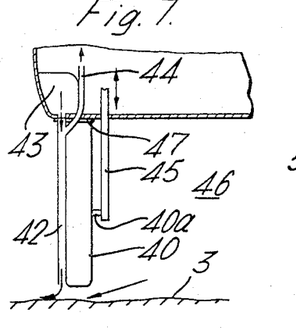
FIGURE 7 is a cross-section on the line B—B of FIGURE 6.

FIGURES 6 and 7 illustrate an embodiment in which the vehicle is of the plenum chamber type, and in which separate flows of gas are specifically provided so that variations in the characteristics of this flow can be sensed and used to actuate the apparatus moving the wall. The wall comprises a series of wall members 40 of hollow form which are spaced apart and have sufficient stiffness to contain pressure in the cushion space 46. The wall members 40 are connected to each other by flexible membranes 41, and their upper ends are attached to the vehicle body by hinges 47. In each wall member 40 there is a tube 42 extending from top to bottom of the member 40 and gas is fed to the tubes 42 from a duct 43. The fluid streams out of the bottoms of the tubes 42 toward the surface 3.

Once the vehicle is in operation a particular clearance occurs between the bottom of each wall member 40 and the surface 3. This clearance will depend upon the mass-flow of gas fed to the cushion space 46 and the weight of the vehicle. The characteristics of the flow of gas through the tubes 42 will vary with variation in the clearance. For example, if the clearance decreases the static pressure in the tubes 42 will increase and vice versa. This pressure variation can be sensed through a branch tube 44 which is connected to a pressure sensing device (not shown) which controls apparatus for moving the wall members 40 up or down by means of actuating rods 45 pivotally connected to spigots 40a on the members 40.

It will be appreciated that the actual construction of the wall can vary considerably. Provided that the wall can be moved up and down it may be of rigid or flexible construction, or a combination of both. It must of course be capable of sustaining the cushion pressure, but the ability to do this can be provided by making the wall as a whole sufficiently stiff to resist deflection by the cushion pressure, or local stiffening members may be provided. Alternatively, or in addition, ties or the like can be used. It will generally be required that the wall can be moved up and down both as a whole and also locally. The wall can therefore be in the form of a single structure capable of movement both as a whole or locally, or can comprise a series of wall members which may or may not be connected together. In the examples described above, the wall, or wall members forming the wall, are shown as being moved by rods. Conveniently these rods are flexible in order that they may always pass through a particular position in the vehicle bottom and so ease cushion sealing problems.

Figure 8:
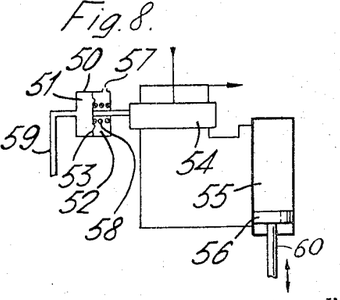
FIGURE 8 is a diagrammatic illustration of one form of operating mechanism for mechanically moving a wall.

FIGURE 8 illustrates a typical pressure sensing and control apparatus which can be used for the embodiments illustrated in FIGURES 1 to 4 and 6 and 7. The pressure variations in these various arrangements are fed to a pressure sensing device 50 comprising two chambers 51 and 52 separated by a diaphragm 53. The pressure variations are fed to chamber 51, which is closed apart from its connection 59 to the pressure sensing head. The other chamber 52 is open to atmosphere by way of a port 57 and contains a spring 58 acting on the diaphragm 53. The diaphragm is connected to a control valve 54 which controls the flow of pressure fluid to a ram 55. An increase in pressure causes the diaphragm 53 to deflect to the right in FIGURE 8, causing the control valve to admit fluid below the piston 56 of the ram 55. This will lift, through piston rod 60 and an actuating rod connected thereto, such as rod 13 of FIGURE 2, the wall or a wall member forming part of the wall. Upward movement of the wall will, of course, result in a decrease in the pressure sensed, and when the wall has lifted sufficiently to restore the clearance between the bottom of the wall and the surface to normal, the diaphragm and control valve will have returned to the mid or shut position. The piston 56 of the ram will be at an intermediate position, where it will remain until a further variation in clearance, increasing or decreasing, will cause a decreaes or increase in the pressure sensed, when the apparatus will again move the wall.

In the examples illustrated in FIGURES 1 to 7 and described above, the wall (or wall member) is moved as a result of sensing the variation of a characteristic of a gas stream from or past the bottom of the wall, and using the variation so sensed to operate a control system which in turn controls the movement of the wall up or down.

However, as stated above, it is possible to use the variation in the characteristics of the gas stream to cause directly, movement of the wall as a whole or locally. For example, it is possible to maintain a particular pressure in an arrangement forming part of a movable wall structure, by the flow of gas from or past the bottom of the wall (or wall member), this pressure varying with variation in clearance between the bottom edge of the wall and the surface, and causing the wall to move up or down.

The part of the arrangement in which a pressure is maintained by the supply of gas may be a duct through which the gas flows to a supply port or the like, from which it issues to form a curtain. The pressure, a static head pressure, will have a particular value when the gas is flowing through the duct, and this pressure will increase if the gas flow from the supply port is restricted or entirely shut off. By making the duct of flexible material with extensible portions, variations in gas pressure within the duct can be caused to vary the shape of the duct and move by deflection the wall or wall member.

A further arrangement is one in which the pressure in a chamber is maintained at a sub-normal value by the flow of gas such as by ejection action, the pressure increasing to normal, or even above normal when the flow of gas is restricted. The increase in pressure in the chamber can be used to deflect the wall member.

Figures 9, 10, 11, 12:
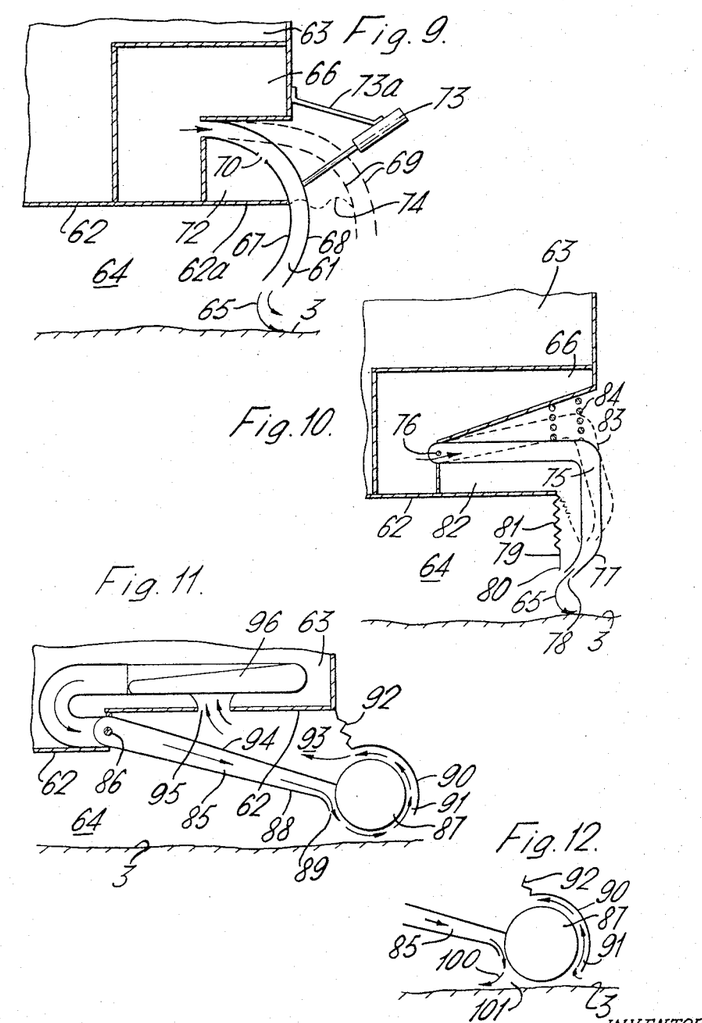
FIGURES 9 to 13 illustrate embodiments of the invention in which the wall is moved directly as a result of a pressure change resulting from a variation in clearance between the bottom of the wall and the surface.

FIGURE 9 illustrates diagrammatically an arrangement in which the wall comprises at least one hollow flexible wall member 61 which depends for part of its length below the bottom surface 62 of the vehicle 63. A cushion of pressurised gas is formed in the space 64, being contained for the upper part of its periphery by the lower part of the wall member 61 and for the lower part of its periphery by a curtain of moving gas 65 streaming from the bottom of the member 61. Gas for forming the curtain 65 is supplied to the hollow wall member 61 via a duct 66, the fluid flowing through the member. A lateral extension 62a of the vehicle bottom 62 defines, with the wall member 61, a chamber 72.

The wall member 61 is of flexible material comprising two spaced apart skins 67 and 68. The inner skin 67 is made of material capable of stretching in a vertical direction, the outer skin 68 being relatively unstretchable. When the flow of gas between the bottom of the wall member 61 and the surface 3 is unrestricted, as in FIGURE 9, the wall member 61 assumes the position shown in full lines.

When the flow of gas streaming from the bottom of the member 61 is restricted, such as when passing over an obstacle or the vehicle tilts, then the pressure of gas within the member 61 increases. Increase of pressure results in the stretching of the inner skin 67 and the member deflects upwards, as indicated by the dotted lines 69.

One or more suction ports 70 are formed in the inner skin 67 of the member 61, so that, as the inner skin is normally in contact with the bottom surface 62, a pressure below the cushion pressure can be maintained in the chamber 72. On upward deflection of the wall member 61, cushion gas has access to the chamber 72 and increases the pressure therein to assist the upward deflection of the wall member 61. Both suction and deflection can be assisted by a differential of area. For example, the outer surface of the inner skin 67 of the wall member 61 can be given an effective increase in area by attaching a flexible diaphragm to said outer surface.

The characteristics of the deflection of the wall member 61 can be varied by varying the stretchability of the two skins 67, 68, both relative to one another and also from position to position in each skin. To provide for local deflection, the wall member 61 is preferably divided into separate sections by vertical webs. Where pressure variation in the chamber 72 is utilised, this chamber is also preferably divided by vertical webs. A hydraulic damper 73 carried on a bracket 73a attached to the vehicle 63 provides a restoring force which urges the wall member 61 from a deflected position to its original position.

The wall member 61 can also be deflected or assisted in its deflection by subjecting the chamber 72 to a positive pressure which increases as the clearance between the bottom wall member 61 and the surface 3 decreases and the gas streaming therebetween is restricted.

One way of subjecting the chamber 72 to a positive pressure is by joining adjacent parts of the vehicle bottom 62 and wall member 61 together by means of a flexible diaphragm 74, so that gas enters the chamber 72 by way of the orifice 70. Under normal operating conditions the wall member 61 is held down against the positive pressure by suitable adjustment of the damper 73 but if gas streaming between the bottom of the wall member 61 and the surface is restricted and so builds up in pressure, the pressure build-up extends to the chamber 72 and is sufficient to overcome the force applied by the damper 73 and so deflect (or assist in deflecting) the wall member 61. The effect of the pressure build-up can be increased by differential of area acted upon by gas pressure within the wall member 61 and the chamber 72, for example, in the manner mentioned above.

In FIGURE 10 a hollow wall member 75 is of substantially rigid formation and is pivotally attached at 76 to the duct 66. The lower part 77 of the wall member 75 ends in a supply port 78 in the form of a nozzle. Positioned inboard of the vehicle 63 and a short distance from the inner edge of the supply port 78 is a baffle member 79 which is attached to and moves with the wall member 75 so that the lower edge of the member 79 co-operates with the inner edge of the supply port 78 to form a port 80. A flexible diaphragm 81 sealably connects the upper edge of the member 79 with the bottom surface 62 of the vehicle 63, and defines with the bottom extension 62a and the adjacent surface of the wall member 75, a chamber 82.

When the vehicle 63 is in operation, gas streaming from the supply port 78 to form the curtain 65 flows in close proximity to the port 80 and has an ejector action producing in the chamber 82 a pressure which is lower than the pressure present in the cushion space 64. This lower pressure holds the wall member 75 in the normal position shown by the full lines in FIGURE 10. If the flow of gas forming the curtain is restricted, the pressure in the chamber 82 increases, up to the cushion pressure, and the wall member 75 is deflected to a position as indicated by the dotted lines 83, for example. A spring 84 provides a restoring force to a deflected wall member 75.

The example illustrated in FIGURE 11 is one in which the gas, instead of issuing to form a curtain which streams across the clearance between the wall and the surface over which a vehicle is travelling, flows in a coherent stream which adheres to a curved surface attached to the bottom of the member, using the well-known Coanda effect. The figure shows a hollow wall member 85 of substantially rigid formation, pivotally attached at 86 to the bottom surface 62 of the vehicle 63. A gas flow guide member 87 of cylindrical form is attached to the bottom of the member 85, the inner skin 88 of the member 85 co-operating with the cylindrical member 87 to form a supply port 89. A curved baffle member 90 extends round the outer part of the cylindrical member 87, and is spaced therefrom to form a duct 91. The lower end of the duct 91 is situated a short distance above the lowest part of the cylindrical member 87. The upper end of the baffle member 90 is sealably attached to the bottom surface 62 of the vehicle 63 by a flexible diaphragm 92. A chamber 93 is formed by the bottom surface 62, the outer skin 94 of the hollow member 85 and the diaphragm 92, the upper end of the duct 91 connecting with the chamber 93. The inlet 95 of a pump 96 supplying the gas which flows through the hollow member 85 is connected to the chamber 93 and draws gas therefrom.

In operation the pump 96 draws gas, normally air, from the chamber 93, the gas flowing through the hollow member 85 and issuing from the supply port 89. The gas flows in a coherent stream round the lower part of the cylindrical member 87 to enter the duct 91. The gas flows through the duct 91 to the chamber 93. The gas flowing through the duct 91 still retains a large part of its original energy content and the pressure in the chamber 93 assumes a datum which is a function of the pump suction and the energy content of the gas flowing into the chamber 93 via the duct 91. The wall member 85 assumes a normal position relative to the surface as shown in FIGURE 11.

If the clearance between the lower part of the cylindrical member 87 and the surface 3 decreases, the flow of gas round the lower part of the cylindrical member is restricted accordingly. There is thus a reduction in the flow of energised air into the duct 91. To make up the necessary flow to the pump intake, air from the surrounding atmosphere is drawn through the duct 91 into the chamber 93. However, as this air has a much lower energy content than the air which normally flows beneath the cylindrical member 87, the pressure in the chamber 93 is depressed and the hollow member 85 is deflected upwards by pressure differential.

A further deflecting effect can also occur when the flow of the gas stream beneath the cylindrical member 87 is restricted, as illustrated in FIGURE 12. When the flow of gas beneath the cylindrical member 87 is restricted, the gas stream breaks away and flows inwards as shown at 100. A small cushion of pressurised gas is formed at 101 and this assists in deflecting the hollow member 85 upwards.

Figure 13:
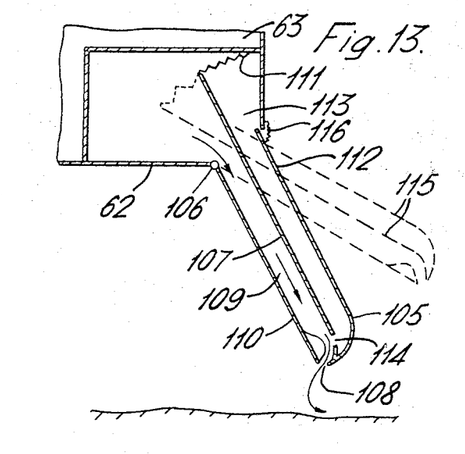

FIGURE 13 illustrates an arrangement in which a hollow wall member 105 is of substantially rigid form and has an inner skin 110 pivotally attached at 106 to the bottom surface 62 of the vehicle 63. The interior of wall member 105 is divided longitudinally into two by a central web 107. At the bottom of the wall member 105 is a supply port 108 to which gas is fed through the inner port 109 formed by the inner skin 110 member and the web 107. The upper end of the web 107 is sealably connected to the vehicle structure by a flexible diaphragm 111, and forms with the web 107 and the outer skin 112 of the member 105 an enclosed chamber 113. The outer skin 112 is sealably attached to the surface 62 by a flexible seal 116. A draw-off aperture 114 is formed in the lower end of the web 107 so that as the gas flows through the inner port 109 to stream out of the supply port 108 it maintains a depressed pressure in the chamber 113.

If the flow of gas from the supply port 108 is restricted, the pressure in the chamber 113 is increased, first to the normal atmospheric pressure and then to a higher pressure equivalent to the static pressure of the gas supply to the inner port 109 of the wall member 105. This increase in pressure causes the wall member 105 to be deflected upwards, as indicated by the dotted lines 115.

Although, in FIGURE 13, the wall member 105 is illustrated as applied to the front or rear of a vehicle, it can also be applied to the sides. In such an application it could be arranged that a series of wall members extend along the side of the vehicle, either contiguously or separated and connected by flexible diaphragms, or similar arrangement, with the wall members deflecting rearwards. Such deflection would be convenient in that the lower parts would be running in the direction which would be imposed on the wall members by contact with the surface 3.

In the examples described illustrated in FIGURES 9 to 13, the amount of vertical movement of the wall (or wall member) will depend upon the reduction in clearance between the bottom of the wall and the surface over which the vehicle is travelling. In the examples illustrated in FIGURES 9 and 10 and 13, an initial decrease in clearance will have substantially no effect, but further reductions in clearance will have an increasing effect. The wall (or wall member) will move progressively as the clearance decreases and assume new positions depending upon the various forces imposed on the wall. Generally, as the wall moves it will operate with reducing clearances between the bottom of the wall and the surface until at full upward deflection there will be a minimum clearance.

Figure 14:
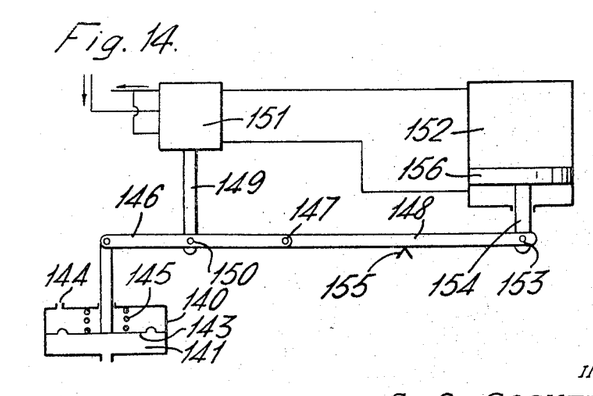
FIGURE 14 is a diagrammatic illustration of another form of operating mechanism for mechanically moving a wall.

FIGURE 14 illustrates a pressure sensing and control apparatus similar to the apparatus of FIGURE 8 but having a "feed back" characteristic.

Referring to FIGURE 14, pressure variations are fed to a pressure sensing device 140 comprising a pair of chambers 141, 142 separated by a diaphragm 143. Pressure variations are fed to chamber 141 which is closed except apart from its connection to the pressure sensing head. The chamber 142 is open to atmosphere by way of a port 144 and contains a spring 145 acting on the diaphragm 143. The diaphragm is connected to one end of a lever 146 the other end of which is pivotally connected at 147 to one end of another lever 148. A rod 149 is pivotally connected at 150 to an intermediate part of the lever 146 and forms part of a control valve assembly 151 which controls the flow of fluid to a ram 152. The other end of the lever 148 is pivotally connected at 153 to the piston rod 154 of the ram 152 and the lever 148 pivots about a pivot point 155. The piston rod 154 is connected to the wall member actuating rod.

An increase of pressure sensed by the chamber 141 causes the diaphragm to deflect upwardly to cause the control valve assembly 151 to admit fluid to below the piston 156 of the ram 152 to raise the piston and with it the wall or wall member connected thereto. Upward movement of the piston 156 causes the levers 146, 148 to pivot so as to restore the control valve of the assembly 151 to its original position.

In all of the above described examples local movement of the wall can occur and this can be enhanced by subdividing the wall vertically, or by making the wall of a series of wall members. To reduce the weight of the moving structure, the wall members may not be contiguous but may be spaced apart by short distances and connected by one or more flexible skins.

It may be desirable to control or limit the movement of the wall at any time and an overide can be provided. The overide can be manually operated or automatically operated, for example by a trim sensing device. The overide can limit the amount of movement of the wall or completely prevent movement as a whole or locally. Thus the wall can be used to provide stabilising forces on a vehicle by direct inter-reaction with the surface.

The invention can be used to form part of a "two-stage" flexibility system. For example, an upper part or stage can comprise a composite wall (or wall member), the upper part of which is according to the present invention, the lower part being of a more simple construction, such as a simple flexible skirt which is itself readily deflected by contact with the surface. The wall would move in two stages, the lower part first deflecting quite rapidly, the upper part deflecting more slowly in response to variations in one or more characteristics of the flow of gas from or past the lower edge of the lower part. In many cases the lower part would be the only part to move to any extent; for example, where the surface irregularities were small and of high frequency. Over other forms of irregularity, the upper part of the wall would tend to take up a position relative to the mean height of the irregularities, the lower part of the wall dealing with local deflections either side of the mean.

In each of the above described embodiments and modifications thereof a wall (or a wall member) has been moved away from the surface beneath when the clearance therebetween has decreased but it should be appreciated that the invention is not so limited. In certain circumstances it may be desirable to move a wall (or wall member) still further towards the surface beneath in the event of the clearance between the wall and the surface decreasing. This may be done, for example, in a vehicle wherein its supporting cushion is divided in the manner disclosed by U.K. patent specification No. 944,502 to form a plurality of smaller cushions. The effect of this division or compartmentation is that if the clearance between the vehicle and the surface beneath is reduced, there is an increase in pressure of the cushion or cushions beneath the converging parts of the vehicle and the surface and a decrease in pressure of the cushion or cushions beneath the diverging parts of the vehicle and the surface, the difference in pressure creating a righting force which tends to restore the vehicle to its original position. By employing the invention to move a wall (or wall member) still further, at least initially, towards the surface when parts of the vehicle and surface are already converging, the pressure of the cushion or cushions beneath the converging parts is built up more rapidly and the time taken for restoration of the vehicle to its original position is reduced accordingly.

There are several obvious ways of performing this "reverse" movement of a wall (or wall member). With reference to FIGURE 8, one way, for example, would be to make a suitable change-over of the connections between the control valve 54 and the ram 55 so that the piston 56 of the ram is moved down when the diaphragm 53 of the sensing device 50 is deflected under an increase in pressure.

Figure 15:
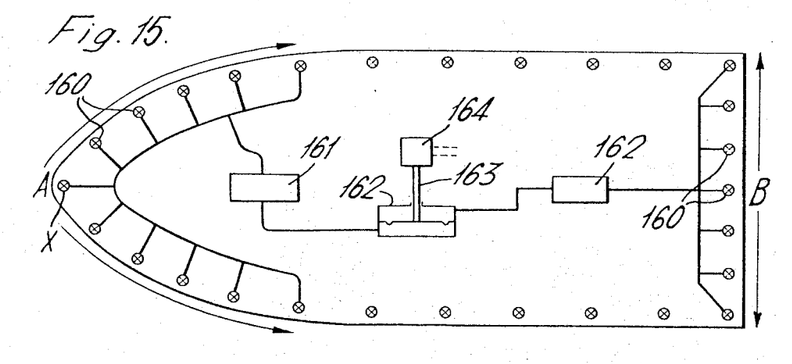
FIGURE 15 is a diagrammatic plan view illustrating the positioning of probes about a vehicle.

In a further modification of the invention, it is possible to provide phase-advance of required movement of a wall member (or wall). For example, by positioning sensing heads in advance of the particular part of the wall, the movement of which they control, the wall (or wall member) can be caused to start moving before a variation in attitude becomes apparent. My copending U.S. patent application No. 375,496, filed June 16, 1964, describes in full a suitable phase-advance system but which can be described more briefly with reference to FIGURE 15. FIGURE 15 is a diagrammatic plan view indicating the positions of probes 160 at various positions around the periphery of the vehicle. The probes 160 can be considered as being pressure sensers, as the probes 12 of FIGURE 2, although the probes can be arranged to sense other parameters. As pressure sensing probes, the probes at the front of the vehicle, for example over the length A, are connected to a first integrating chamber 161. Similarly, the probes at the rear, over the length B, are connected to a second integrating chamber 162. The chambers 161, 162, are connected to opposite sides of a diaphragm actuator 162, operating through a control rod 163, a control valve 164. The valve 164 is connected in a similar manner as are the valves 54 and 151 of FIG- URES 8 and 14 respectively, to actuating devices arranged to move the wall (or wall members) to control pitching of the vehicle. The probes along each side of the vehicle can be used similarly to detect and effect control rolling and all of the probes can be used to detect and effect control of heaving.

Individual probes can also be used to provide a phase-advance system. For example, the probe right at the front of the vehicle, indicated at X, will detect variations in clearance at the front and this detection can be used to actuate a part of the wall disposed toward the rear of the vehicle. Similarly, each probe can be caused to actuate, through control valves, parts of the wall disposed further towards the rear. The distance between a probe and the wall part it causes to be moved can be equated to the time lag inherent in the system. To obtain complete phase-advance it is necessary to have some sensing means for sensing variations in surface height in advance of the vehicle, such as by probes projecting in front of the vehicle, or some optical or electronic sensing device. Some phase-advance can be obtained purely by measuring rate of pressure change sensed by the probes 160 instead of only pressure change.

It will be appreciated that the mean surface, for small rapid undulations, is normally horizontal while for long term undulations the mean surface will eventually be parallel to actual profile, although there are likely to be small rapid undulations superimposed on the long term undulations.

As stated above, various means of sensing variations in attitude of the vehicle can be used. Whilst sensing or detecting movement can be satisfactory, sensing or detecting a change in acceleration can provide an indication 90° sooner. Gyroscopes and accelerometers are typical sensing means and a further means is an aerofoil attached to the main body of the vehicle. An aerofoil has an advantage that once attached there is no need for adjustment from time to time.

I claim:
1. A vehicle for travelling over a surface and which, in operation, is supported, at least in part, above the surface by a cushion of pressurised gas formed beneath the vehicle, the cushion being contained for at least part of its periphery by a wall movably attached to the vehicle body and wherein, in providing support for the vehicle, gas streams between the wall and said surface, comprising means for sensing variations in the flow characteristics of the gas stream resulting from a variation in the clearance between the lower edge of said wall and said surface, and means operatively controlled by said sensing means for moving the wall vertically in response to such variation in flow characteristics.

2. A vehicle as claimed in claim 1 wherein said sensing means include a pressure sensing probe carried by said wall.

3. A vehicle as claimed in claim 2 wherein said probe is carried within the wall.

4. A vehicle as claimed in claim 1 wherein said wall is hollow and said gas is caused to stream from the interior of the wall and said sensing means include means sensitive to change in pressure of gas within said wall.

5. A vehicle as claimed in claim 4 wherein said gas is caused to issue from the bottom edge of said wall to form a curtain of moving gas.

6. A vehicle as claimed in claim 1 wherein said gas is caused to flow down one side of said wall before streaming between said wall and said surface.

7. A vehicle as claimed in claim 6 wherein said sensing means include a vane member disposed in the path of said gas flowing down one side of said wall and arranged so as to be movable according to said variation, and means for translating said movement into signals transmittable to said means for moving the wall.

8. A vehicle as claimed in claim 1 wherein at least part of said wall is pivotally attached to the vehicle body.

9. A vehicle as claimed in claim 1 wherein said wall is flexible.

10. A vehicle as claimed in claim 9 wherein said wall is inflatable.

11. A vehicle as claimed in claim 10 wherein said wall is inflatable by gas which eventually streams between said wall and the surface beneath.

12. A vehicle as claimed in claim 1 wherein, in response to variation in flow characteristics of gas streaming between said wall and the surface beneath, the wall is moved upwards when the clearance between the wall and the surface decreases and downwards when the clearance increases.

13. A vehicle as claimed in claim 1 wherein, in response to variation in flow characteristics of gas streaming between said wall in the surface beneath, the wall is moved downwards, at least initially, when the clearance between the wall and the surface decreases.

14. A vehicle according to claim 1 wherein the wall comprises a plurality of separate wall members.

15. A vehicle according to claim 1 provided with means whereby the wall is moved in response to means sensitive to conditions associated with parts of the surface over which the vehicle operates and in advance of the wall coming into proximity of said parts.

16. A vehicle as claimed in claim 1 wherein said wall comprises a succession of wall members spaced apart from each other along the length of the wall, and cushion-containing flexible wall means connected to and extending between each neighbouring pair of wall members.

17. A vehicle as claimed in claim 16 wherein the means for causing gas to stream between the wall and said surface is so constructed and arranged that said gas issues from said wall at spaced apart positions along the length thereof, and which includes a plurality of associated sensing means.

18. A vehicle as claimed in claim 17 wherein said wall members are pivotally attached to the vehicle body.

19. A vehicle for travelling over a surface and which, in operation, is supported, at least in part, above the surface by a cushion of pressurised gas formed beneath the vehicle, comprising a wall movably attached to the vehicle body for containing the cushion for at least part of its periphery, means for causing gas to stream between the wall and said surface, and means responsive to variations in the flow characteristics of the gas stream resulting from variations in the clearance between the lower edge of said wall and said surface for moving the wall vertically relative to the vehicle body.

References Cited by the Examiner
UNITED STATES PATENTS
3,191,705   6/1965   Jones et al. __________ 180—7

BENJAMIN HERSH, *Primary Examiner.*

M. S. SALES, *Assistant Examiner.*